US008099816B2

(12) United States Patent
MacNeil

(10) Patent No.: US 8,099,816 B2
(45) Date of Patent: Jan. 24, 2012

(54) VEHICLE WASH SYSTEM

(75) Inventor: Daniel J. MacNeil, Barrie (CA)

(73) Assignee: MacNeil Wash Systems Limited, Barrie, ON (CA)

( * ) Notice: Subject to any disclaimer, the term of this patent is extended or adjusted under 35 U.S.C. 154(b) by 1222 days.

(21) Appl. No.: 11/195,960

(22) Filed: Aug. 3, 2005

(65) Prior Publication Data

US 2007/0028406 A1 Feb. 8, 2007

(51) Int. Cl.
*B60S 3/06* (2006.01)
(52) U.S. Cl. .................. 15/53.3; 15/53.2; 15/DIG. 2
(58) Field of Classification Search ............... 15/53.1, 15/53.2, 53.3, DIG. 2
See application file for complete search history.

(56) References Cited

U.S. PATENT DOCUMENTS

| 4,306,325 A | 12/1981 | Pyle et al. | |
| 4,450,600 A | 5/1984 | Shelstad | |
| 5,463,788 A * | 11/1995 | Ennis | 15/97.3 |
| 5,715,558 A * | 2/1998 | Johnson | 15/53.3 |
| 5,930,859 A * | 8/1999 | Ennis | 15/53.3 |
| 6,145,146 A | 11/2000 | Decker | |
| 6,202,244 B1 | 3/2001 | Anderson | |
| 6,264,754 B1 | 7/2001 | Bowman | |
| 7,293,315 B2 * | 11/2007 | Ennis | 15/53.3 |
| 7,293,316 B2 * | 11/2007 | Ennis | 15/53.3 |

* cited by examiner

*Primary Examiner* — Randall Chin

(57) ABSTRACT

A brush station for use in a vehicle wash system includes a support frame. A first brush unit support is mounted to the frame and a first brush mounted on the first brush support member. Also, a second brush support is mounted to said frame and a second brush is mounted on the first brush support. The first brush support is mounted to the frame at a first longitudinal position that is upstream in the direction of vehicle travel from a second longitudinal position where the second brush support is mounted to the frame. The first brush support extends generally from the frame in the direction of travel and the second brush support extends generally from the frame opposite to the direction of travel. An exterior surface of a vehicle moving through the station in the direction of travel will be cleaned by said first and second brushes. Partial or substantially complete longitudinal overlap can be provided between the first and second brush units. The first and second brush supports may be pivotally mounted to the frame.

58 Claims, 17 Drawing Sheets

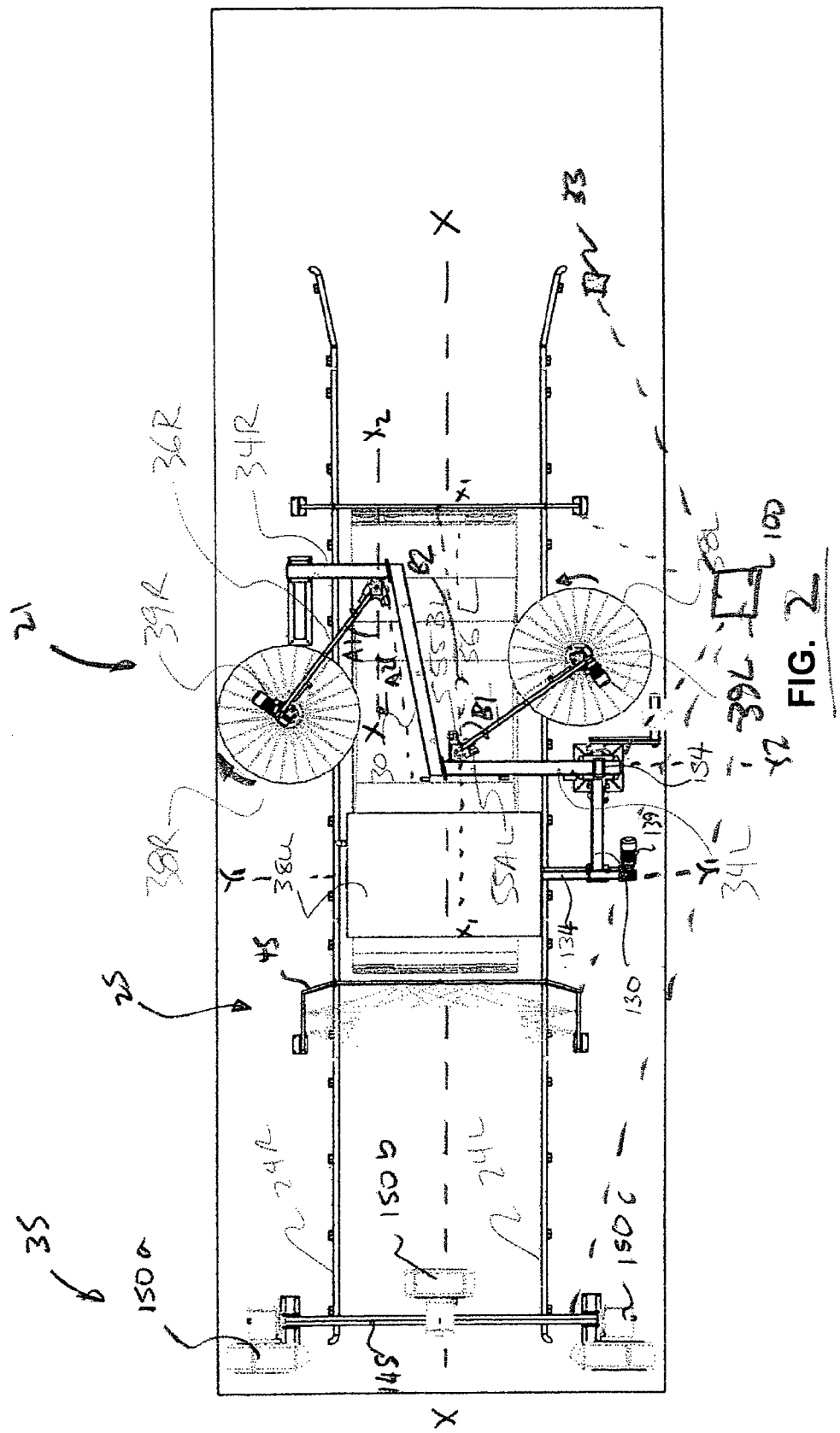

VEHICLE WASH SYSTEM

FIELD OF THE INVENTION

The present invention relates to vehicle wash structures of the type in which a vehicle moves through the structure while being acted upon by brushes and, in particular, to a brush support in such vehicle wash structures.

BACKGROUND

Automated automobile washing has a history reaching back several decades. In some cases the vehicle to be washed is driven or conveyed through a vehicle wash structure while being acted upon by washing elements. In other cases, the vehicle is stationary and the vehicle wash structure includes washing elements that move relative to the vehicle while acting upon the vehicle. In any case, vehicle wash structures often include washing elements designed to wash particular portions of the vehicles. For example, one known type of washing element is a relatively large and long cylindrical brush, rotating about a generally vertical axis that is used to wash vertical surfaces of the vehicle. Such a washing element may be stationary and may wash one or more side surfaces as the vehicle moves past the brush. Alternatively, the vertical, rotating brush may be located at one side of the vehicle and may be moved along a path parallel to the path of vehicle travel.

In a further alternative, a brush is mounted at the distal end of a pivot arm, where the proximal end of the pivot arm is pivotally connected to a frame above the vehicle and the brush is used to wash one side and one or both ends of the vehicle. An exemplary vehicle wash structure of this type is presented in U.S. Pat. No. 6,264,754, issued to Bowman on Jul. 24, 2001.

In Bowman, after the brush has washed the side of the vehicle, the brush moves around the rear end of the vehicle. Unfortunately, as the brush attempts to wash the rear end of the vehicle, the vehicle moves away from the brush.

To provide for more effective washing of the rear end of the vehicle, further brushes on further pivot arms may be added, as illustrated by U.S. Pat. No. 4,306,325 issued to Pyle et al. on Dec. 22, 1981 and U.S. Pat. No. 4,450,600 issued to Shelstad on May 29, 1984. The orientation of the further pivot arms is opposite to the direction of travel of the vehicle and, as such, the further brushes may follow the vehicle as the vehicle moves forward and effectively wash the rear end of the vehicle. However, to accommodate the further pivot arms, the structure may be considered to be excessively large.

As real estate devoted to vehicle wash structures is valuable, compact design is favorable for vehicle wash structures. Where a vehicle wash structure is associated with a gas filling station, real estate freed up through the use of a compact vehicle wash structure may be used for additional pumps or for expanded retail space, in either case, providing additional income possibilities.

As such, there remains a need for a compact vehicle wash structure that can effectively wash a vehicle.

SUMMARY

A vehicle wash structure includes a brush support member. In preparation for washing a vehicle, the brush support member may be moved into a position of initial contact between the vehicle and a brush supported by the brush support member. In the initial position, the brush support member extends along, and opposite to, the direction of travel of the vehicle.

Advantageously, in some embodiments of the invention, a space savings is realized for the overall vehicle wash structure design. In accordance with an aspect of the present invention there is provided a brush station for use in a vehicle wash system in which a vehicle traverses a path in a direction of travel, the path having a longitudinal axis, the brush station comprising a support frame positioned proximate the path; a first brush unit comprising a first brush support mounted to the frame and a first brush mounted on the first brush support member; a second brush unit comprising a second brush support mounted to the frame and a second brush mounted on the first brush support; the first brush support mounted to the frame at a first longitudinal position that is upstream in the direction of travel from a second longitudinal position where the second brush support is mounted to the frame; the first brush support extending generally from the frame in the direction of travel; the second brush support extending generally from the frame opposite to the direction of travel; wherein an exterior surface of a vehicle moving through the station in the direction of travel will be cleaned by the first and second brushes.

In accordance with another aspect of the invention there is provided a brush support for use in a vehicle wash system in which a vehicle traverses a path in a direction of travel, the brush support comprising: a first vertical support member; a first horizontal support member extending from the first vertical support member, the first horizontal support member extending over the path and generally transverse to the direction of travel; a first brush support member pivotally attached to, and extending generally horizontally from the first horizontal support member; a first cylindrical brush driven in rotation about a first generally vertical axis; a first position control apparatus adapted to position the first brush support member in a position of initial contact between the vehicle and the first cylindrical brush, the first brush support member extending, in the position of initial contact, away from the first horizontal support member along, and opposite to the direction of travel; a second vertical support member; a second horizontal support member extending from the second vertical support member, the first horizontal support member extending over the path and generally transverse to the direction of travel; a second brush support member pivotally attached to, and extending substantially horizontally from, the second horizontal support member; a second brush driven in rotation about a first generally vertical axis; a second position control apparatus adapted to position the second brush support member in a position of initial contact between the vehicle and the second brush, the second brush support member extending, in the position of initial contact between the vehicle and the second brush, away from the second horizontal support member along and in the direction of travel.

In accordance with another aspect of the invention there is provided a brush station for use in a vehicle wash system in which a vehicle traverses a path in a direction of travel, the path having a longitudinal axis, the brush station comprising: a support frame positioned proximate the path; a first brush support mounted to the frame for movement within the path; a first brush mounted on the first brush support member; a second brush unit mounted to the frame for movement across within the path; a second brush mounted on the first brush support; the first brush support extending generally from the frame in the direction of travel; the second brush support extending generally from the frame opposite to the direction of travel; wherein an exterior surface of a vehicle moving through the station in the direction of travel will be cleaned by the first and second brushes.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate an example embodiment of this invention:

FIG. 2 illustrates a top plan view of the complete vehicle wash system and vehicle of FIG. 1;

DETAILED DESCRIPTION

Figure 1:
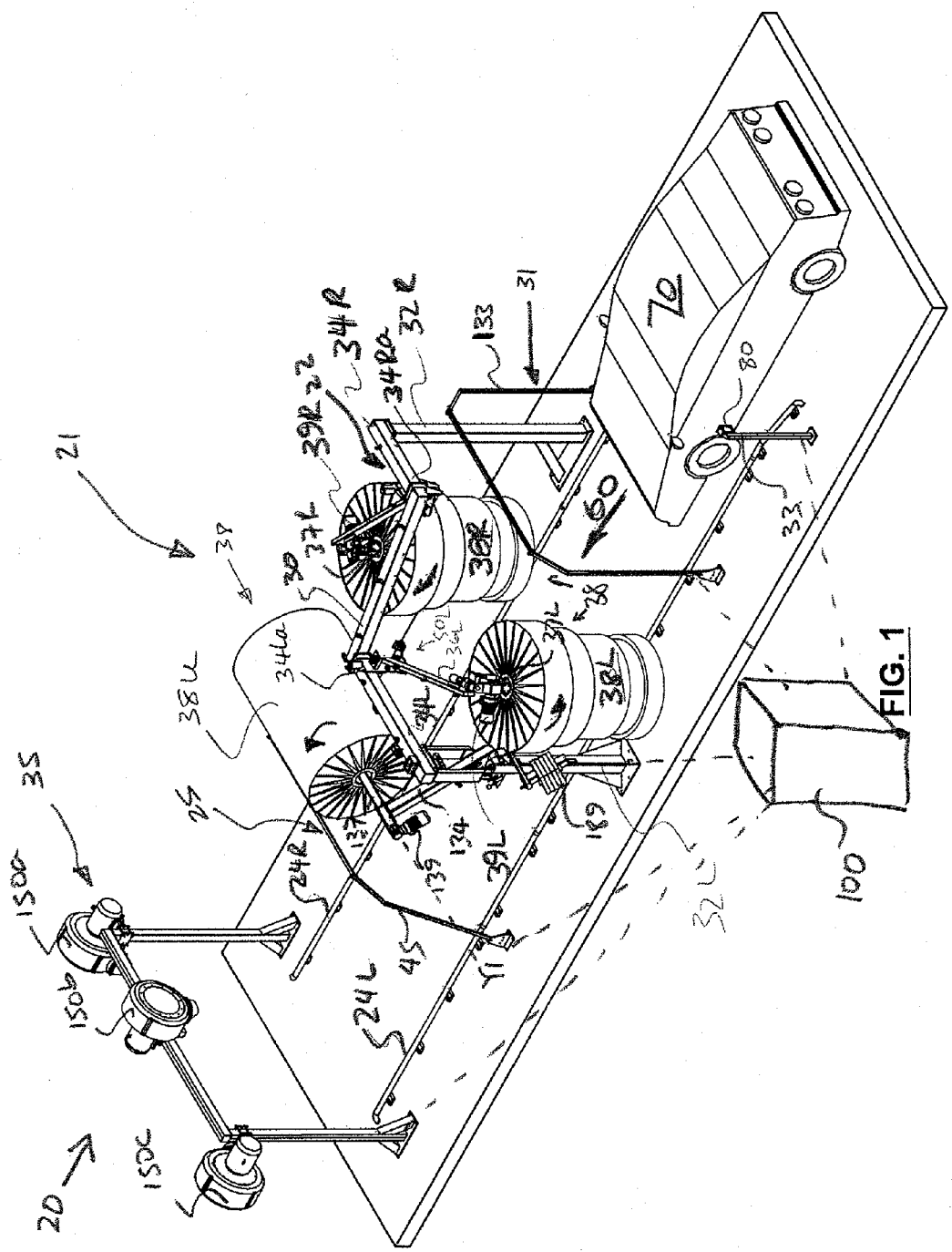
FIG. 1 illustrates a perspective view of a brush support according to an embodiment of the present invention in combination with further vehicle wash equipment in a complete vehicle wash system and a vehicle.
Figure 2B:
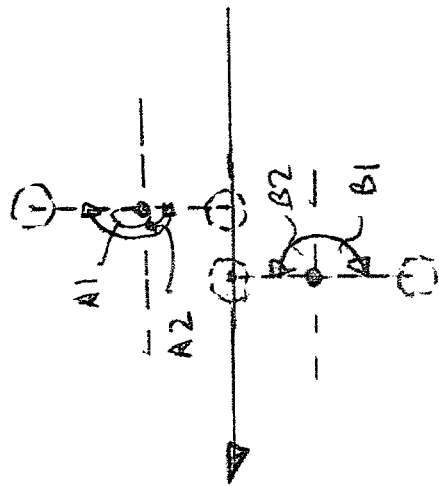
FIGS. 2a-2d are schematic plan view illustrations of other possible brush support configurations in accordance with some other example embodiments.
Figure 2D:
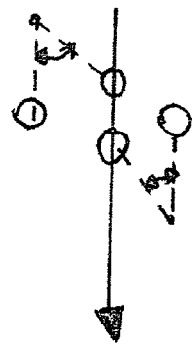
Figure 2A:
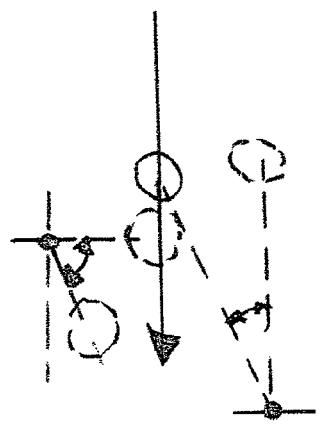
Figure 2C:
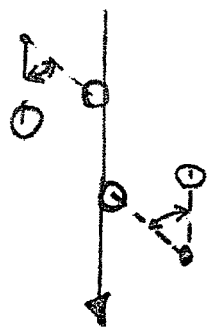
Figure 3:
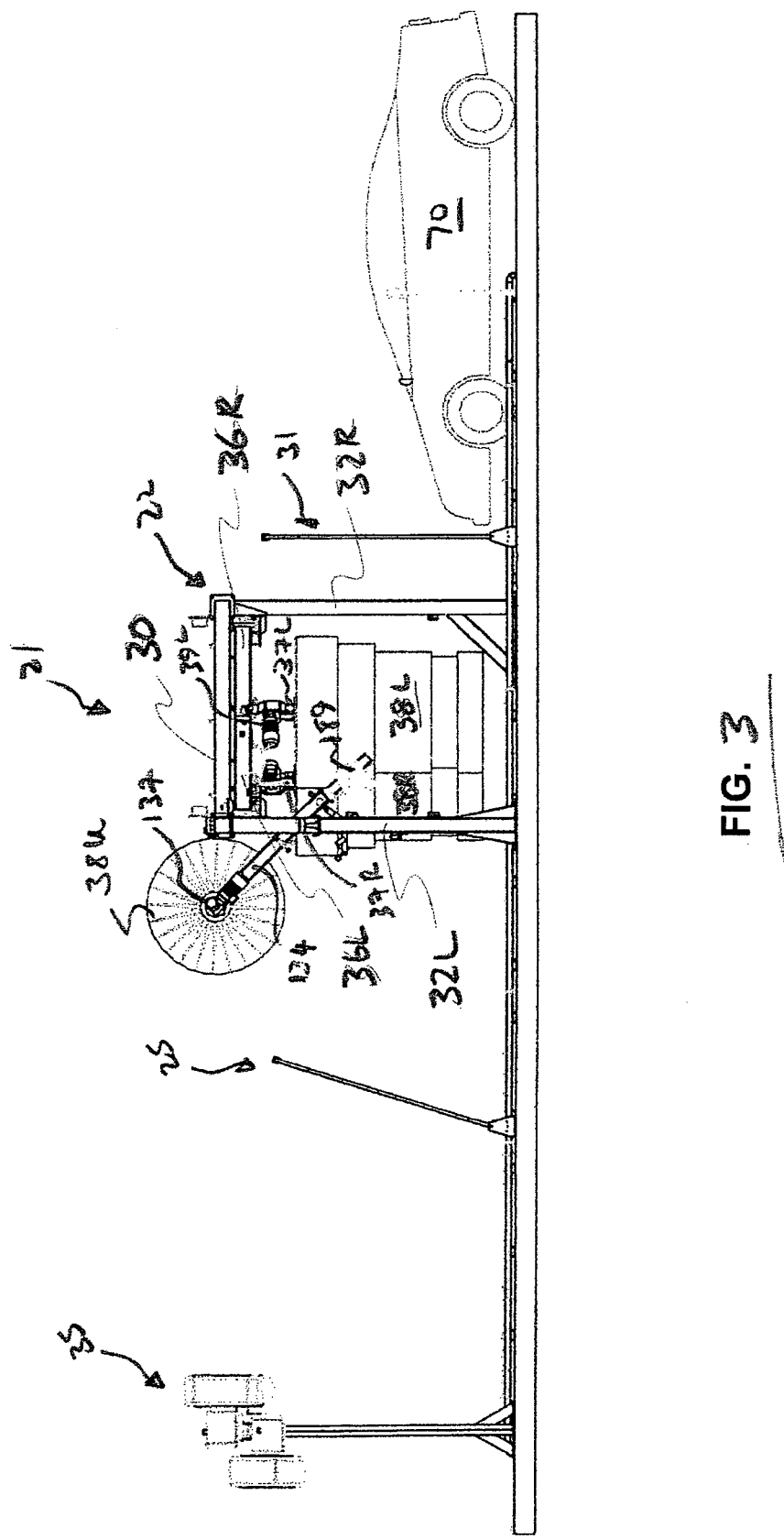
FIG. 3 illustrates a left side elevation view of the complete vehicle wash system and vehicle of FIG. 1.

As illustrated in FIGS. 1, 2 and 3 a vehicle wash system generally designated 20 can be configured to wash a vehicle such as a car, truck, bus or other vehicle. Wash system 20 includes an entry approval station 33, a preliminary treatment station 31, a brush washing station 21, a rinse station 25 and a drying station 35. The vehicle wash system 20 can be controlled by a computer control system 100. Examples of computer control systems currently available to control the operation of a vehicle wash system 20 include model MINI-MAC CONTROLER (Trademark) # 75-560-10-MP made by MacNeil Wash Systems Limited.

Vehicle wash system 20 also includes a guide mechanism for guiding the vehicle through the stations and defines a path 60 of travel for the vehicle 70 to follow while being washed. In some embodiments, the vehicle is actually driven through system 20 under its own power and the path is restricted by left guide rail 24L and a right guide rail 24R, which maintain the vehicle in an appropriate transverse position. In other embodiments the vehicle 70 can be carried through the system 20 on a conveyer system, as is known in the industry.

Sensors can be deployed along path 60 to (a) provide controller 100 with information relating to the longitudinal position of the vehicle along path 60 and (b) provide controller 100 with specific information relating to the shape and position of various parts of the exterior surface of the vehicle 70, and the positions of those parts as they move along path 60. For example pressure sensors along the floor or eye beams extending along, path 60 can be employed to provide information as to when a vehicle is at or approaching a particular station. Vision systems can which monitor the actual shape and position of exterior surface of parts thereof can also be employed.

With respect to the various stations, entry approval station 33 located at the beginning of path 60 may be a known system designed to approve the passage of a vehicle 70 for a wash treatment by system 20. Examples of entry approval systems 33 include interactive key-pad and visual displays 80 which require and request that a customer input a numeric code on the key pad to gain acceptance to the wash system 20. Systems made by Unitec Electronics such as the Roadway Pro (Trademark) model #156-075813-8 are examples of systems that can be employed to fulfil this function.

Preliminary treatment station 31 may include a frame 133 supporting or providing pipes with openings to eject pressurized liquids such as soapy water on to the exterior surface of the vehicle 70 to be washed (sometimes referred to as the "pre-soak"). Station 31 can provide the vehicle 70 with other preliminary treatments prior to the vehicle moving to brush washing station 21 such as for example special tyre cleaning fluids.

Figure 11:
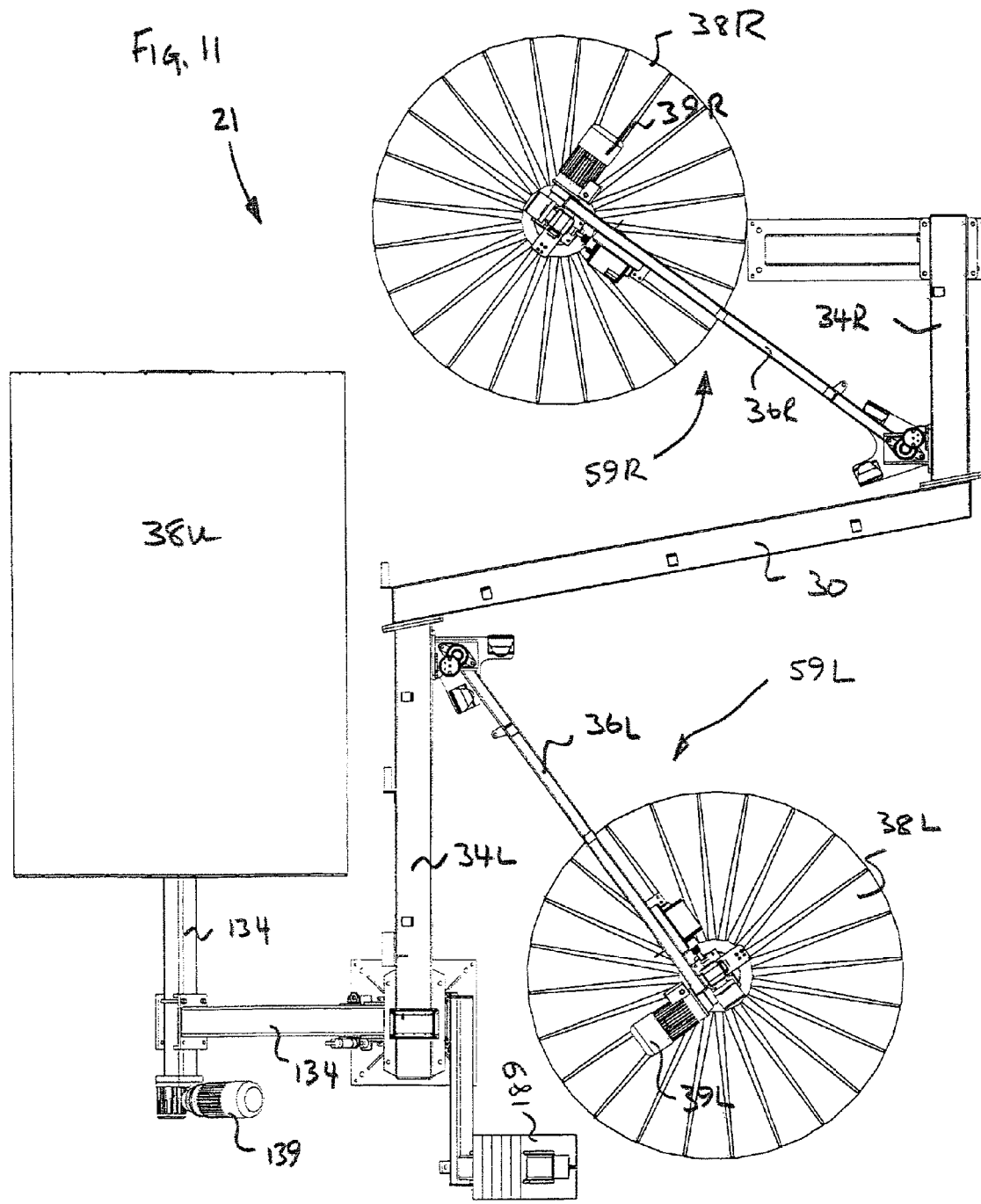
FIG. 11 is a top plan view of the brush station employed in the system of FIGS. 1-10.
Figure 12:
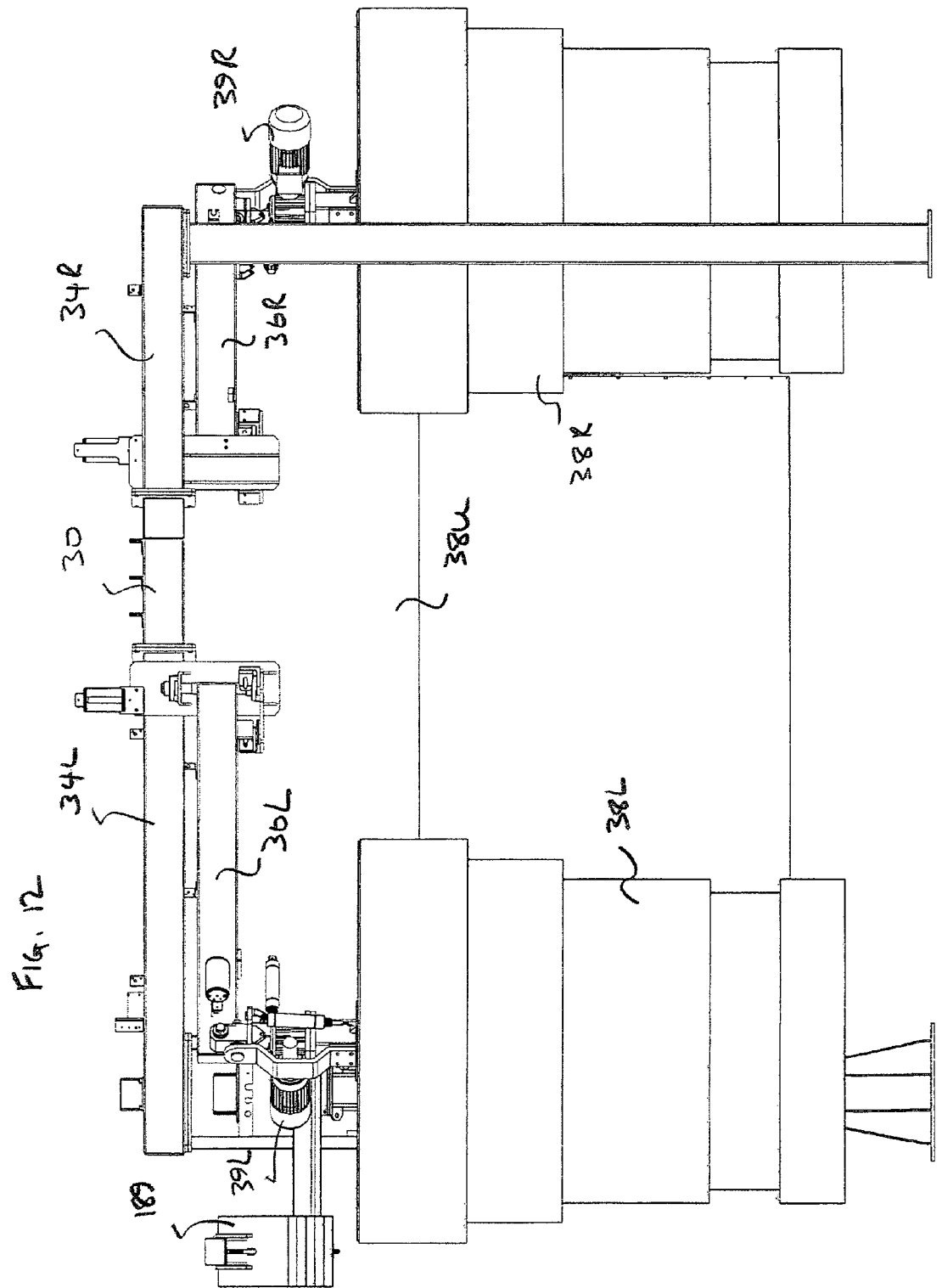
FIG. 12 is a front elevation view of the brush station of FIG. 11.
Figure 13:
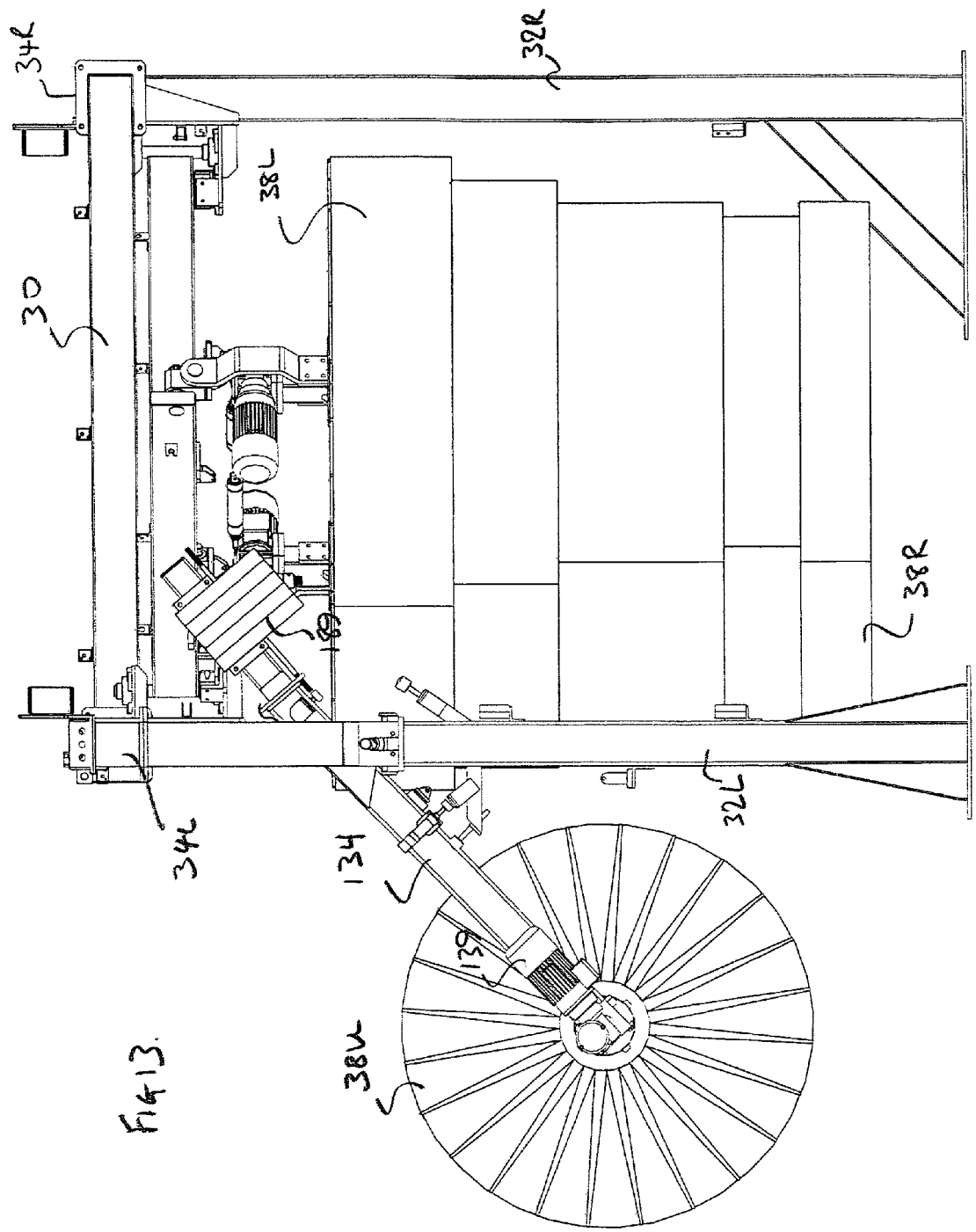
FIG. 13 is a left side elevation view of the brush station of FIG. 12.

Brush washing station 21 is where the exterior surface of the vehicle 70 has most of the dirt and grime removed and includes a plurality of brush units 59L and 59R having brushes 38, which are mounted to a support frame generally designated 22. Brush units 59L and 59R (See FIG. 11) include brush support members 36L and 36R to which are mounted brushes designated 38L and 38R. Brushes 38L and 38R are generally vertically oriented and generally utilized to clean the generally vertically oriented exterior surfaces of vehicle 70. Brushes 38 can be EXPRESSLANE (Trademark) model RS 701 foam brushes made by MacNeil Wash Systems mounted on a core assembly which is affixed to the end of a rotating shaft. Brushes 38 are rotated and supplied with water and soap and engage the exterior surfaces of the vehicle to clean the vehicle 70.

The brushes 38 can be mounted to frame 22 in such manner that they are biased towards contact with the exterior surface of the vehicle 70. This may be a simple mechanical force bias to bias the brushes 38 towards engagement with the exterior surface of the vehicle, or a more sophisticated system can be utilized that may be computer controlled. Computer controller 100 may be adapted to monitor and maintain appropriate load being applied to the vehicle 70 as it moves through brush station 21. Additionally electronic eye sensors, vision systems or the like (not shown) can determine the position of the car and the position(s) of the exterior surfaces and provide appropriate positioning of the brushes to engage the surface of the vehicle and apply an appropriate load. An example of a brush positioning control system is MINI-MAC CONTROLER (Trademark) model # 75-560-10-MP manufactured by MacNeil Wash Systems Limited.

Returning to brush station 21, and with reference to FIGS. 1, 2, 3 and 11, 12 and 13, the brush support frame 22 is provided proximate path 60 and may include several hollow beam or posts made from a strong material such as a suitable steel or aluminum. Frame 22 may as illustrated include a left generally vertical support member 32L, located adjacent to the left guide rail 24L, and a right generally vertical support member 32R, located adjacent to the right guide rail 24R. Left guide rail 24L and right guide rail 24R run parallel to and are equally spaced from a central longitudinal axis X-X (FIG. 2), which defines the middle longitudinal axis of travel path 60. This axis X-X will in some, but not all, embodiments or applications, also coincide with an axis through the transverse mid point of the vehicle 70 as it moves along the path (the vehicle may sometimes be symmetrical about its mid-way longitudinal axis and the mid-way axis may be aligned with the path axis X-X).

Extending from the left vertical support member 32L and oriented transverse to the direction of and extending at least part way over the travel path 60 is a left generally horizontal support member 34L. Similarly, extending from the right vertical support member 32R and extending at least part way over the path 60 is a right generally horizontal support member 34R. Left vertical support member 32L and the right vertical support member 32R are both transversely spaced from each other approximately equidistant from axis X-X, and are also longitudinally spaced relative to each other along the path 60. Accordingly the distal end 34La of the left horizontal support member 34L that is distant from the left vertical support member 32L and the distal end 34Ra of the right horizontal support member 34R that is distant from the right vertical support member 32R may be inter-connected by a longitudinally and transversely oriented support member 30. Support member 30 will improve the overall structural stability of frame 22. It will be appreciated however that other configurations of frame 22 can be employed to brush support members 36R and 36L.

Figure 4:
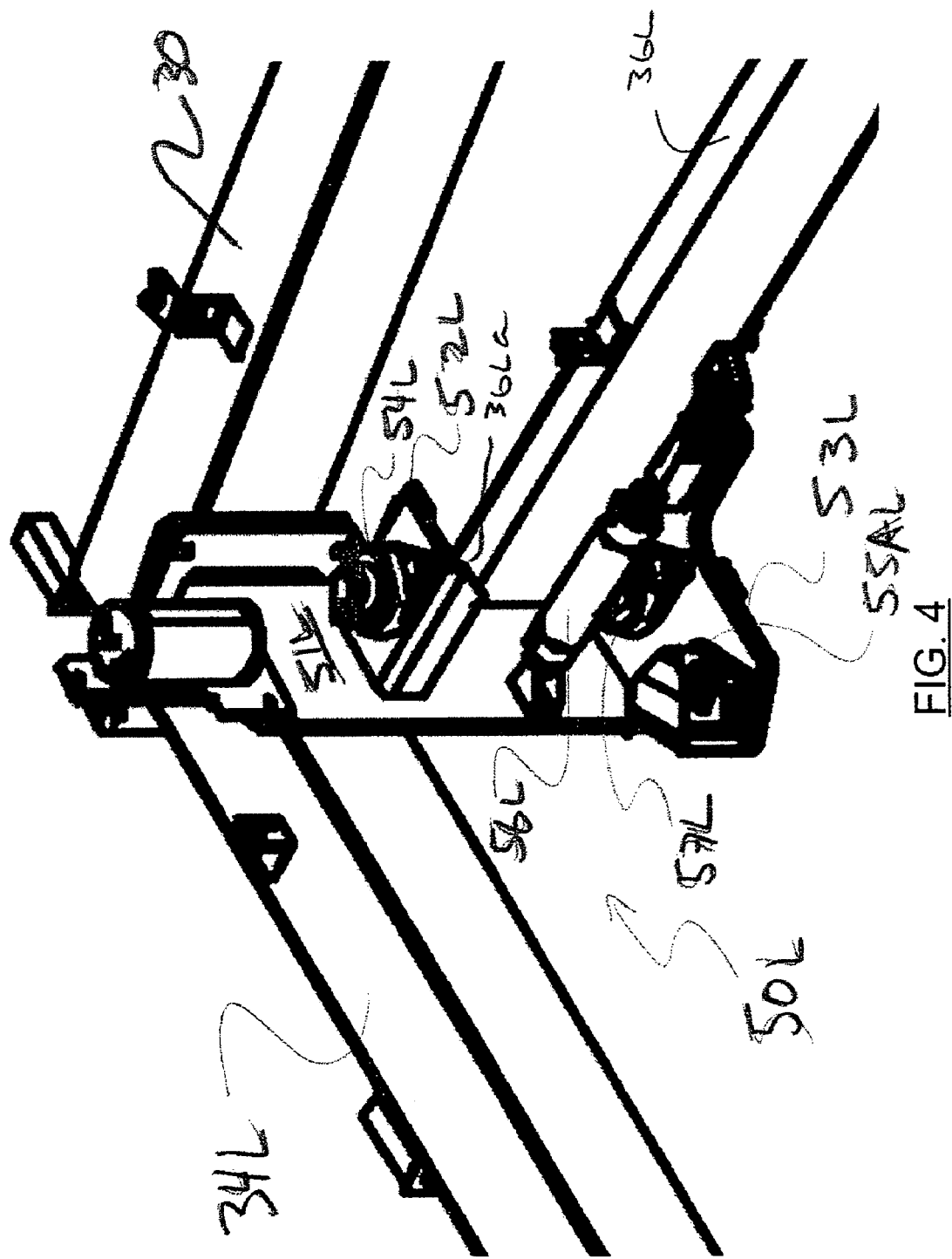
FIG. 4 illustrate, in detail, a bracket assembly according to an embodiment of the present invention.

Mounted to the left horizontal support member 34L, at a point close to where the left horizontal support member 34L attaches to the longitudinal support member 30, is a left bracket assembly 50L, illustrated in detail in FIG. 4. The left bracket assembly 50L includes a left back plate 51L, which is mounted to, and depends vertically from, the left horizontal support member 34L. Extending horizontally from the vertically depending left back plate 51L, along the path 60 and in a direction opposite to the direction of travel of the vehicle 70, are a left top plate 52L and a left bottom plate 53L. Seated in an aperture in the left top plate 52L is a left top bearing 54L. Similarly, seated in an aperture in the left bottom plate 53L is a left bottom bearing 57L. Extending horizontally from the left bracket assembly 50L, and the left horizontal support member 34L, and mounted for pivoting movement to bracket assembly 50L is an end 36La of a left brush support member 36L. Proximal end 36La of support member 36L, can pivot on and is connected to a left pivot pin (not shown) which extends between the left top bearing 54L and the left bottom bearing 57L.

A first left pivot stop 55AL and a second left pivot stop 55BL are provided on a top side of the left bottom plate 53L. While only the left first pivot stop 55AL is illustrated in FIG. 4, both left pivot stops 55AL, 55BL are illustrated in FIG. 2.

Mounted to the left back plate 51L of the left bracket assembly 50L is one end of a left brush support positioning device 56L, which, in the embodiment illustrated, is a hydraulic or pneumatic cylinder. The opposite end of the left brush support positioning device 56L is connected to the left brush support member 36L. Hydraulic or pneumatic cylinder 56L may be a double acting pneumatic cylinder which can be supplied by hydraulic fluid from a fluid sump through piping by a hydraulic pump or by pressurized air in the case of a pneumatic cylinder. An example of a pneumatic cylinder that may be employed is air cylinder model no. 2000D02-04A made by Numatics Ltd. Other positioning devices can also be employed.

In a similar manner, a right bracket assembly with a right brush support positioning device (not shown) configured like the left bracket assembly and left brush support positioning device, can be provided to move and control the position of a right brush support member 36R that extends horizontally from the right bracket assembly, which is affixed to the right horizontal support member 34R.

Pressurized air or hydraulic fluid can be supplied through suitable valves and piping (not shown) to control and effect the movement of the right and left brush support positioning devices, independent of each other. The operation of the valves can be controlled by controller 100.

At the end of the left brush support member 36L that is distal from the left horizontal support member 34L depends a left cylindrical brush 38L mounted on a rotatable shaft 37L that can rotate about a substantially vertical axis. The shaft 37L can be rotated by a left brush motor 39L. Similarly, at the end of the right brush support member 36R that is distal from the right horizontal support member 34R depends a right cylindrical brush 38R mounted on a rotatable shaft 37R that can rotate about a substantially vertical axis. The shaft 37R can be rotated by a right brush motor 39R. Although other types of motors may be adapted for use in the humid and wet environment of a vehicle wash, in the exemplary embodiment illustrated in the figures, the left brush motor 39L and the right brush motor 39R are hydraulic motors. An example of a suitable hydraulic motor that can be employed is a motor made by CHAR-LYNN (Trademark) under part no. 104-1011-006. An electric motor made by Flender ower Transmission Inc.—part no. SCAQ25-QH80M4U could also be used.

A transversely mounted cylindrical brush 38U is mounted on a transversely oriented shaft 137 for rotation about a transverse axis Y1 (FIG. 1). Brush 38U is generally utilized to clean the upward facing, generally horizontal exterior surfaces of the vehicle such as the bonnet, roof and trunk. Shaft 137 can be rotatably driven by a brush motor 139. Shaft 137 is supported at an end of a longitudinal support member 134, which is mounted for pivoting movement about a pivot location having a transverse axis Y2. Support member 134 is pivotally mounted to vertical support 32L, and has an opposite end which is weighted with weights 189 so that the weights act as a counter balance to the weight of brush 38U. The rotational position of brush 38U about axis Y1 can be controlled by a hydraulic or pneumatic cylinder 156 interconnected between the frame and support member 134.

Brushes 38U, 38R and 38L can be driven in rotational movement about their respective axes, in the directions of rotation shown in FIGS. 1 and 2. Water and soap can be supplied to the brushes in known ways during the washing of the vehicle by for example spray nozzles manufactured by Hypro EU Limited.

Returning to the vertically oriented brushes 38L and 38R, from FIG. 2 is will be observed that brush support 36R pivots about a pivot axis which is aligned with longitudinal axis X2-X2 and can rotate an angle A1 clockwise (+from axis X2-X2 and angle A2 counterclockwise (−) from axis X2-X2.

Brush support 36L pivots about a pivot axis which is aligned with longitudinal axis X1-X1 and can rotate an angle B1 clockwise (+) from axis X2-X2 and angle B2 counterclockwise (−) from axis X1-X1. (See FIG. 2b. as another example). As illustrated in FIG. 2, longitudinal axis X1-X1 is positioned close to medial path axis X-X. Longitudinal axis X2-X2 is positioned proximate a transversely middle position between axis X-X and a longitudinal axis 24R aligned with rail 24R. As such support member 30 that links ends 34La and 34Ra, also has a transverse component to its orientation. Because of the brush and brush support arrangement, it is not necessary that brush support members 36R and 36L be able to pivot through large angles which makes possible the construction of a brush wash station that is much less complicated and less expensive. In some embodiments, angle A1 can be about +30 degrees; angle is about −12 degrees; and angle B1 can be about +8 degrees; and angle B2 can be about +60 degrees. In the illustrated embodiment in FIG. 2, in a three hundred and sixty degree traverse from a transverse axis, member 36L may span an arc from about 90 degrees to about 180 degrees, and member 36R may span an arc from about 250 degrees to about 315 degrees.

It will however be appreciated that numerous other configurations are possible, each with specific brush support lengths, angle ranges and pivot location positions (both longitudinally and transversely, that are inter-related to each other (see for example FIGS. 2a-2d). The configuration utilized will be dependent on the specific application. In most vehicle wash systems, it will be important that the generally vertical brushes arranged to clean the generally vertical surfaces of the vehicle, will clean all of the generally vertical surfaces of the vehicle. Accordingly, it will be important that the generally vertically oriented brushes clean all of the front, side and rear generally vertical surfaces.

In most configurations, the brush support located upstream in the direction of travel will not traverse a range of greater than 180 to 0 degrees, and the brush located downstream in the direction of travel will not traverse a range of greater than 0 to 180 (see FIG. 2b).

As can be best seen in FIG. 2, right brush support member 36R and right brush are configured and positioned so that they extend longitudinally to substantially completely longitudinally overlap the left brush and left brush support member, but are oriented in opposite longitudinal directions. The pivot location of the right brush support 36R is located longitudinally upstream in the direction of travel from the pivot location of the second brush support 36L. Given the relative locations of the pivot locations and the general longitudinal orientations of the brush units, this provides for a relatively small footprint for wash station 21, which takes up a relatively smaller amount of longitudinal distance. This effect can be realized even if there is not substantially complete overlap. For example one brush and brush support may only partially longitudinally overlap with the other brush; or only the two brushes may partially overlap. (See for example, other configurations depicted in FIGS. 2a, 2b and 2d). Additionally, the footprint may be reduced in longitudinal length, even if there is no overlap during movement of the brush supports (see FIG. 2c). Also, it should be noted that the pivot locations of the brush supports could both be on the same side transversely of the longitudinal axis of the path.

Rinse station 45 may include a frame 45 supporting or providing pipes with openings to eject pressurized, clean water on to the exterior surface of the vehicle 70 to rinse off the residue soap from the exterior of the vehicle 79. Station 45 may also be configured to apply exterior wax treatment to the exterior of the vehicle 70, in a known manner. In some embodiments, the wax is applied at a separate station after the rinse station.

Drying station 35 comprises a plurality of dryer fans 150a, 150b and 150c, mounted to a support frame 145. Examples of known dryers that can be employed include the model TECH 21 drying system manufactured by MacNeil Wash Systems Limited. To conserve energy and maintenance requirements, the system controller 100 can activate dryers 150a-c only when the vehicle 70 is detected by position sensors to be in the vicinity of station 35.

Figure 14:
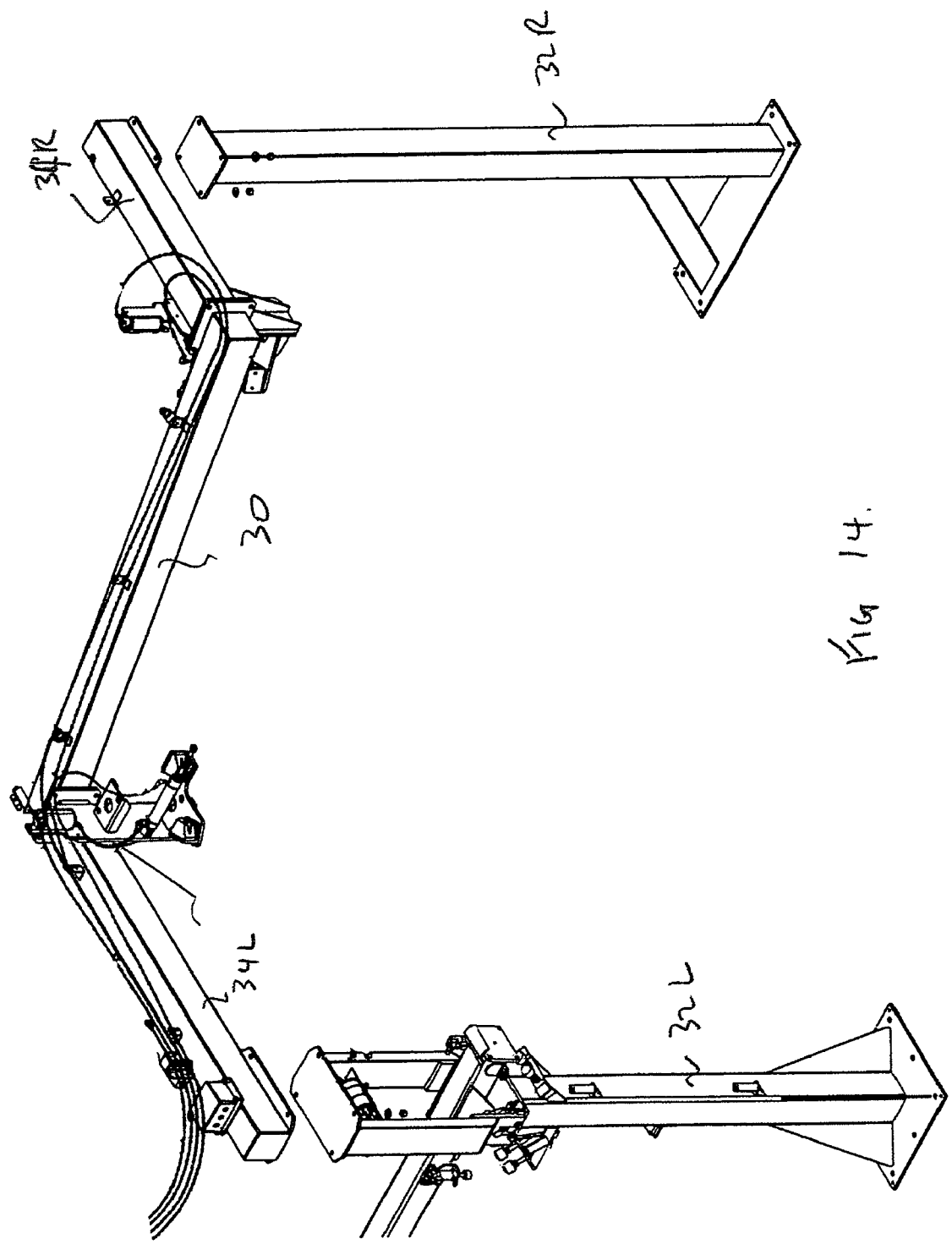
FIGS. 14, 15 and 16 are perspective assembly drawings illustrating additional details of the support frame and the mounting of brush supports thereto.
Figure 15:
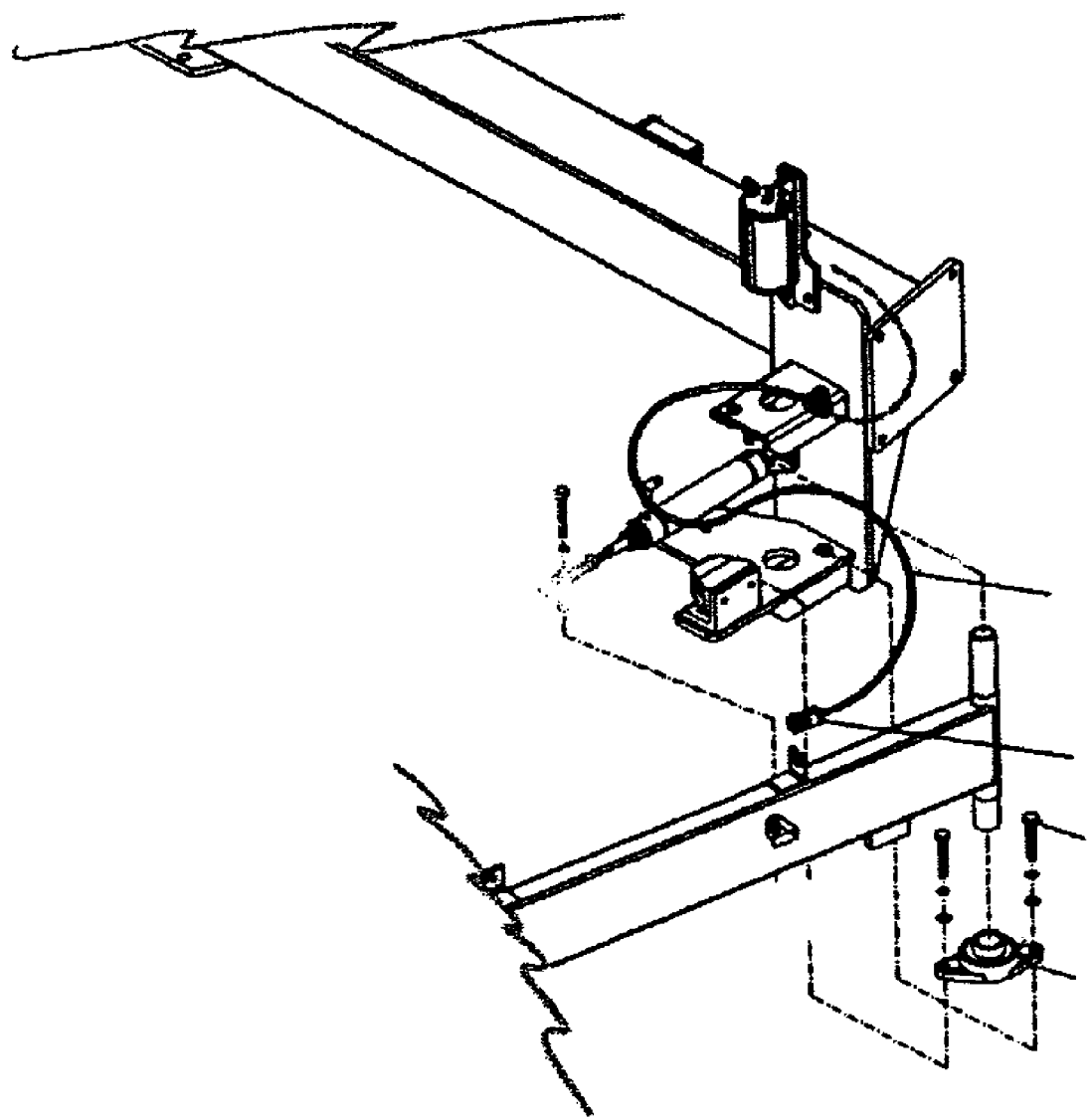
Figure 16:
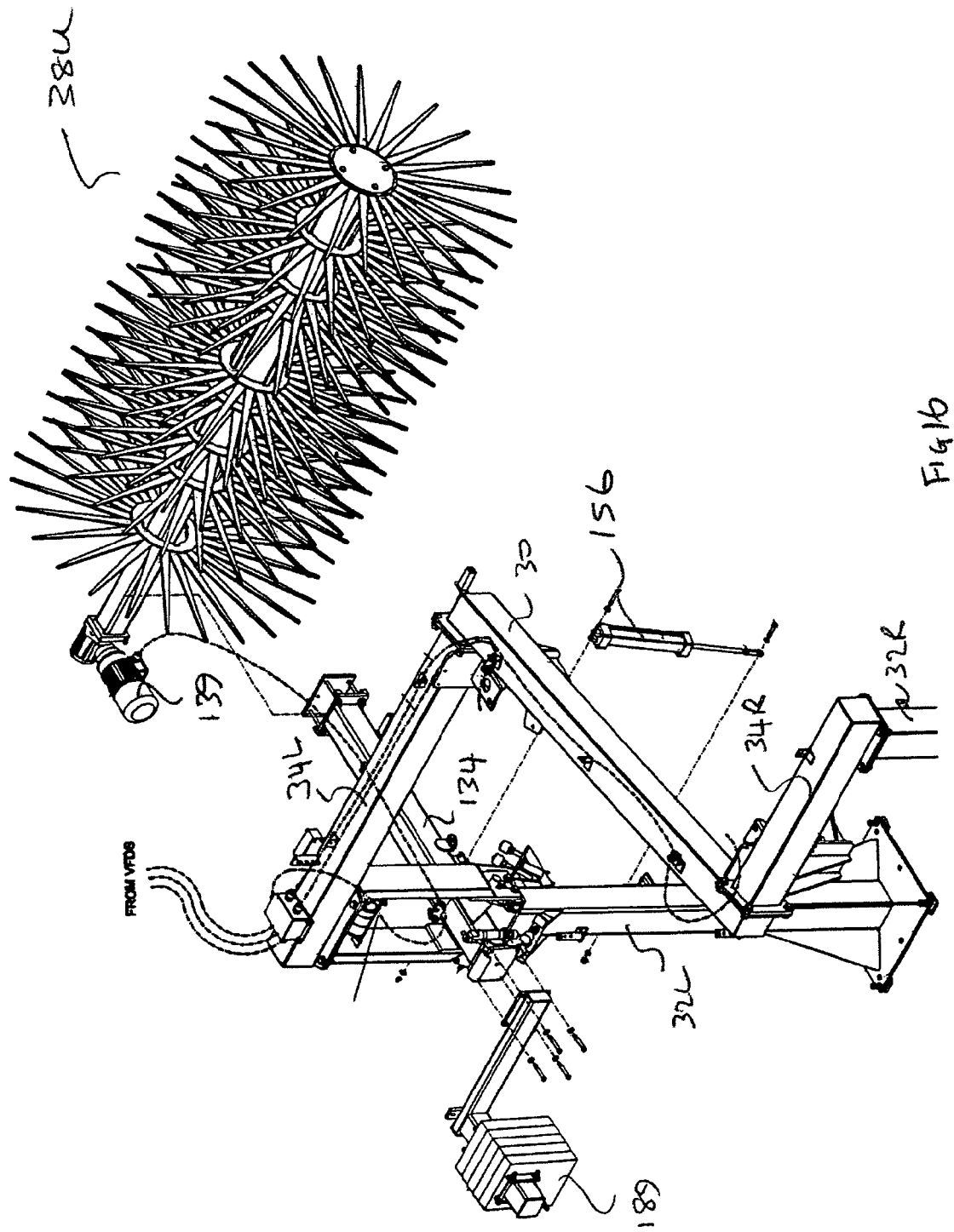

Further details of how the brush support members can be mounted to the support frame are provided in FIGS. 14-16.

In operation of wash system 20, the approach of the vehicle 70 is sensed by position sensing devices, which send a signal to controller 100. Responsive to the sensing of a vehicle, controller 100 first activates the approval station 33, to cause the customer to interact with the controller so as to obtain an acceptance code from the customer. One the customer is accepted, the customer will be told (either by an attendant) or by a display read out, to start to move forward along path 60. In a drive through system 20, the movement of the vehicle can be prompted and monitored by the controller 100 and a series of display screens mounted along path 60. In a conveyor system, once loaded onto the conveyor, the vehicle is carried by the conveyor system along path 60.

Figure 5:
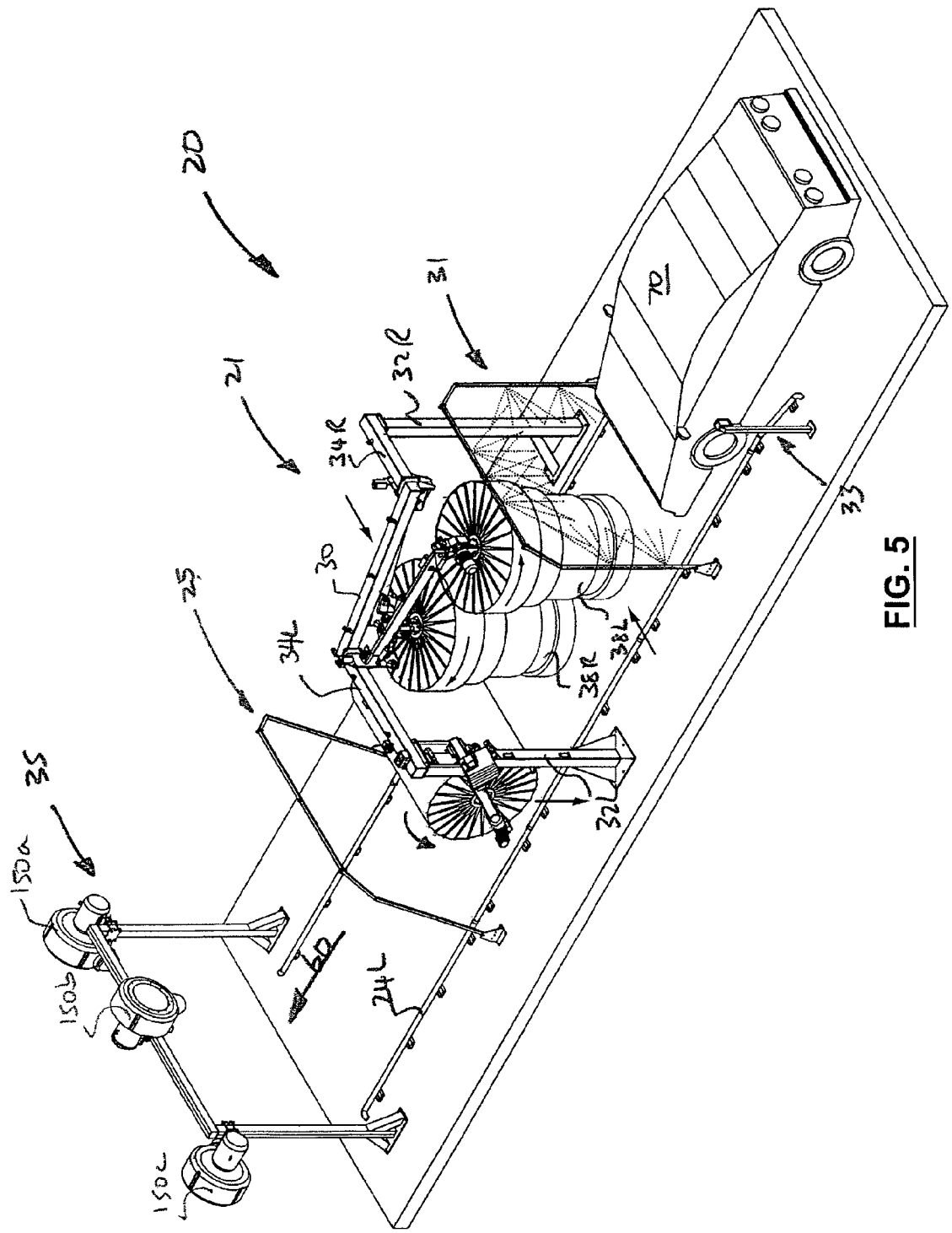
FIG. 5 illustrates, in a perspective view, the complete vehicle wash system of FIG. 1 before a first contact between a left cylindrical brush and the vehicle.

Once the vehicle reaches station 31, the position sensors detect the position of the vehicle 70. This results in a signal that causes controller 100 to activate the preliminary treatment of the vehicle, which may include application of a pre-soaking. As the vehicle continues to move forward, position sensors signal the controller 100 so that the left brush support positioning device 56L is actuated to pivot the left brush support member 36L (which will also be rotating) from an initial rest position (see FIG. 1) to a position of initial contact between the vehicle 70 and the left cylindrical brush 38L (see FIGS. 5 and 6). At the initial contact position, the right brush 38R is positioned substantially in transverse alignment, substantially aligned with middle axis X-X, with right brush 38R, located downstream and just behind left brush 38L. While in the position of initial contact shown in FIGS. 5 and 6, the left brush support member 36L extends away from the left horizontal support member 34L along, and in a direction opposite to, the direction of the path 60 of travel of the vehicle 70.

Additionally, both the left brush motor 39L and the right brush motor 39R may be actuated to start rotating the left cylindrical brush 38L and the right cylindrical brush 38R, respectively.

Figure 6:
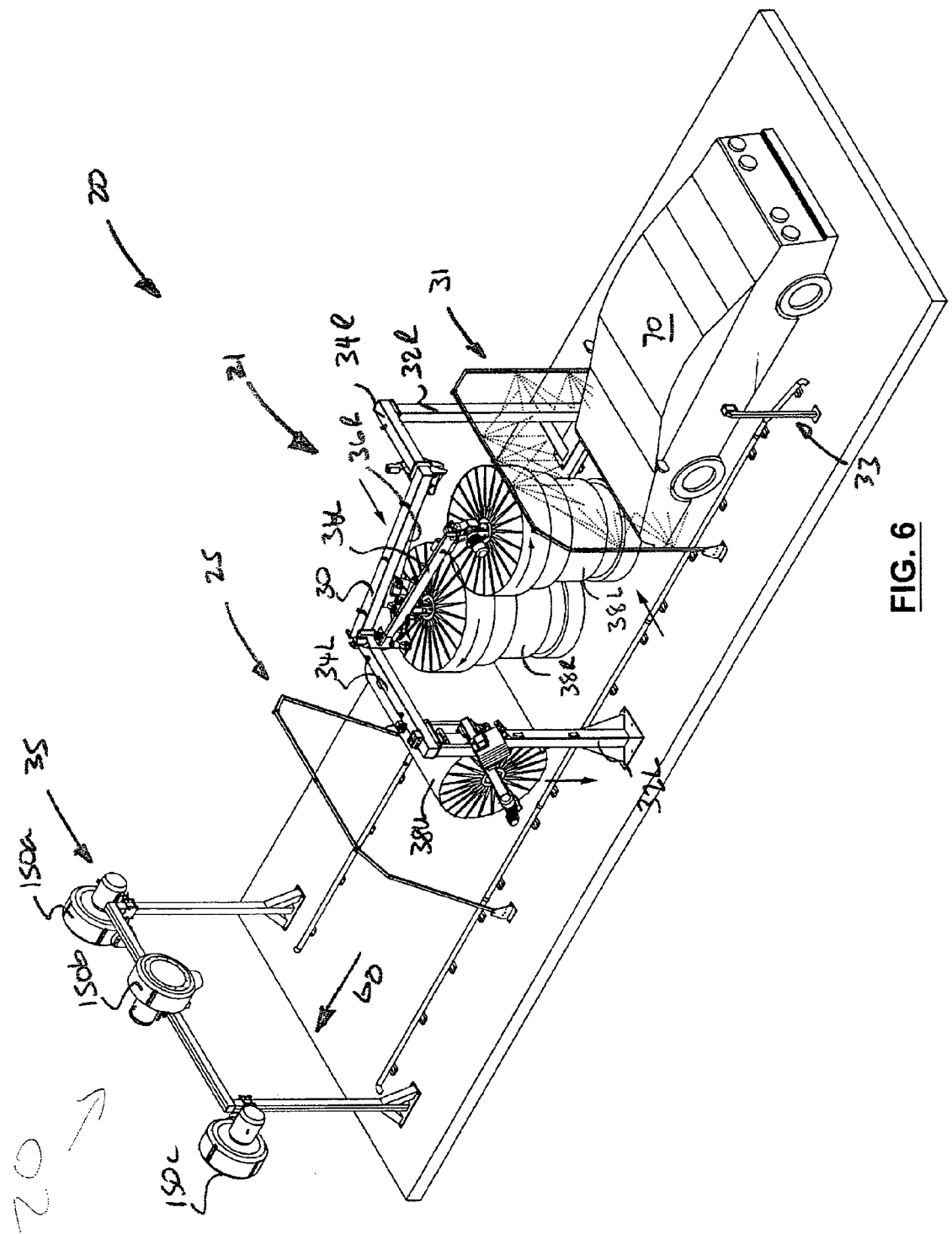
FIG. 6 illustrates, in a perspective view, the complete vehicle wash system of FIG. 1 at a moment of first contact between the left cylindrical brush and a front end of the vehicle.

FIG. 6 illustrates the vehicle 70 in initial contact with the rotating left cylindrical brush 38L.

Figure 7:
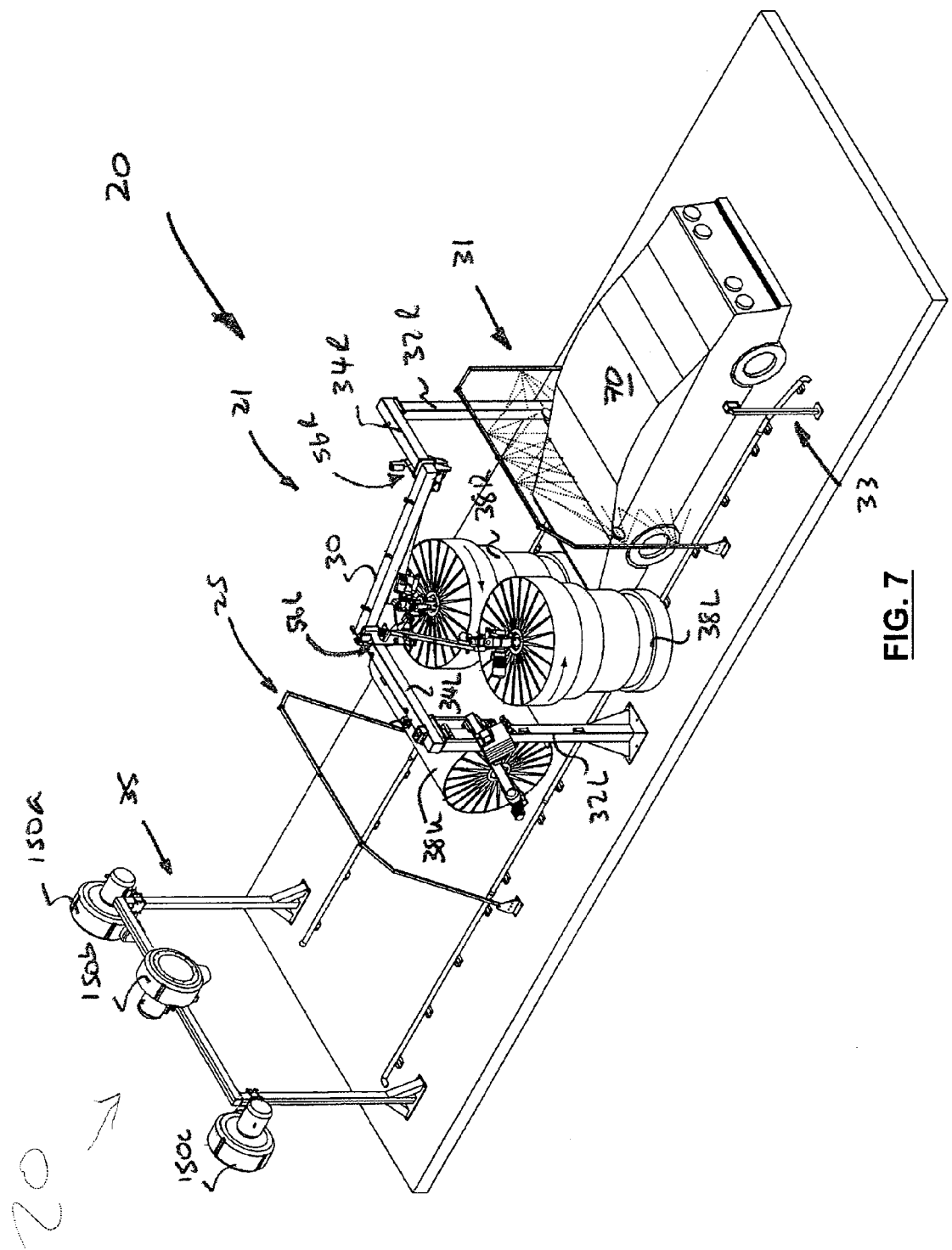
FIG. 7 illustrates, in a perspective view, the complete vehicle wash system of FIG. 1 at a moment of first contact between a right cylindrical brush and the front end of the vehicle.

Responsive to sensors determining that the vehicle 70 is moving forward along the path 60, the left brush support positioning device 56L is actuated to move the left brush support member 36L. While the rotating left cylindrical brush 38L brushes the front end of the vehicle 70, the result of the movement of the left brush support member 36L is that the rotating left cylindrical brush 38L is moved to the left along the front end of, and out of the way of forward progress of, the vehicle 70 to a left outboard position. At the left outboard position, which is illustrated in FIG. 7, the left cylindrical brush 38L may begin to brush the left side of the vehicle 70. FIG. 7 also illustrates the point in time at which the front end of the vehicle 70 makes initial contact with the rotating right cylindrical brush 38R which will cause right brush 38R to start to what the front of the vehicle 70.

Figure 8:
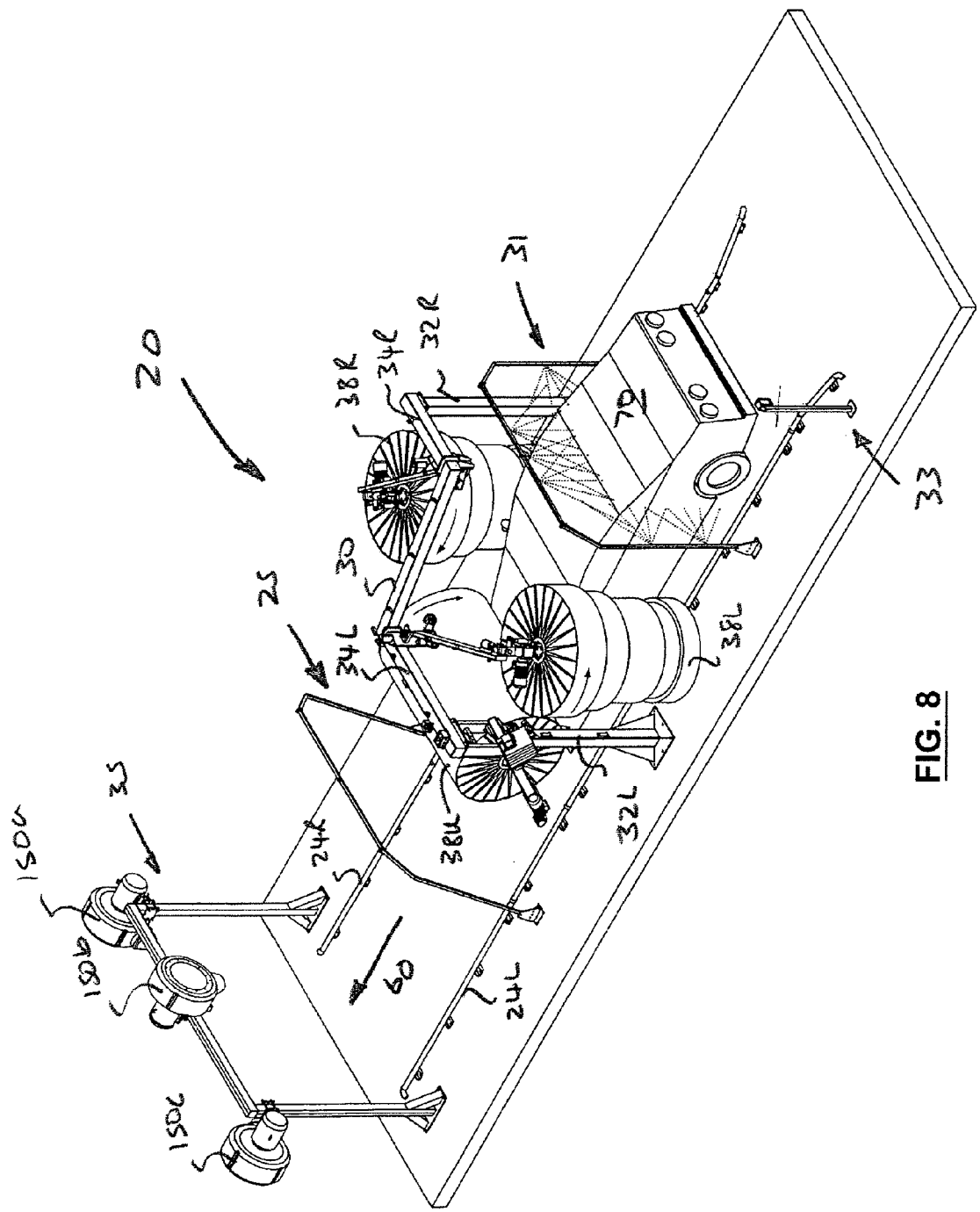
FIG. 8 illustrates, in a perspective view, the complete vehicle wash system of FIG. 1 with the left cylindrical brush and the right cylindrical brush in contact with respective sides of the vehicle.

Responsive to sensors determining that the vehicle 70 is continuing to move forward along the path 60, the right brush support positioning device 56R is actuated by controller 100 to move the right brush support member 36R. While the rotating right cylindrical brush 38R brushes the front end of the vehicle 70, the result of the movement of the right brush support member 36R is that the rotating right cylindrical brush 38R is moved to the right along the front end of, and out of the way of forward progress of, the vehicle 70 to a right outboard position. At the right outboard position, which is illustrated in FIG. 8, the rotating right cylindrical brush 38R may begin to brush the right side of the vehicle 70. The rotating left cylindrical brush 38L continues to brush the left side of the vehicle 70. Additionally, transverse upper brush 38U will be actuated by controller to start to roll over the top of the vehicle to clean the upward facing surfaces.

Figure 9:
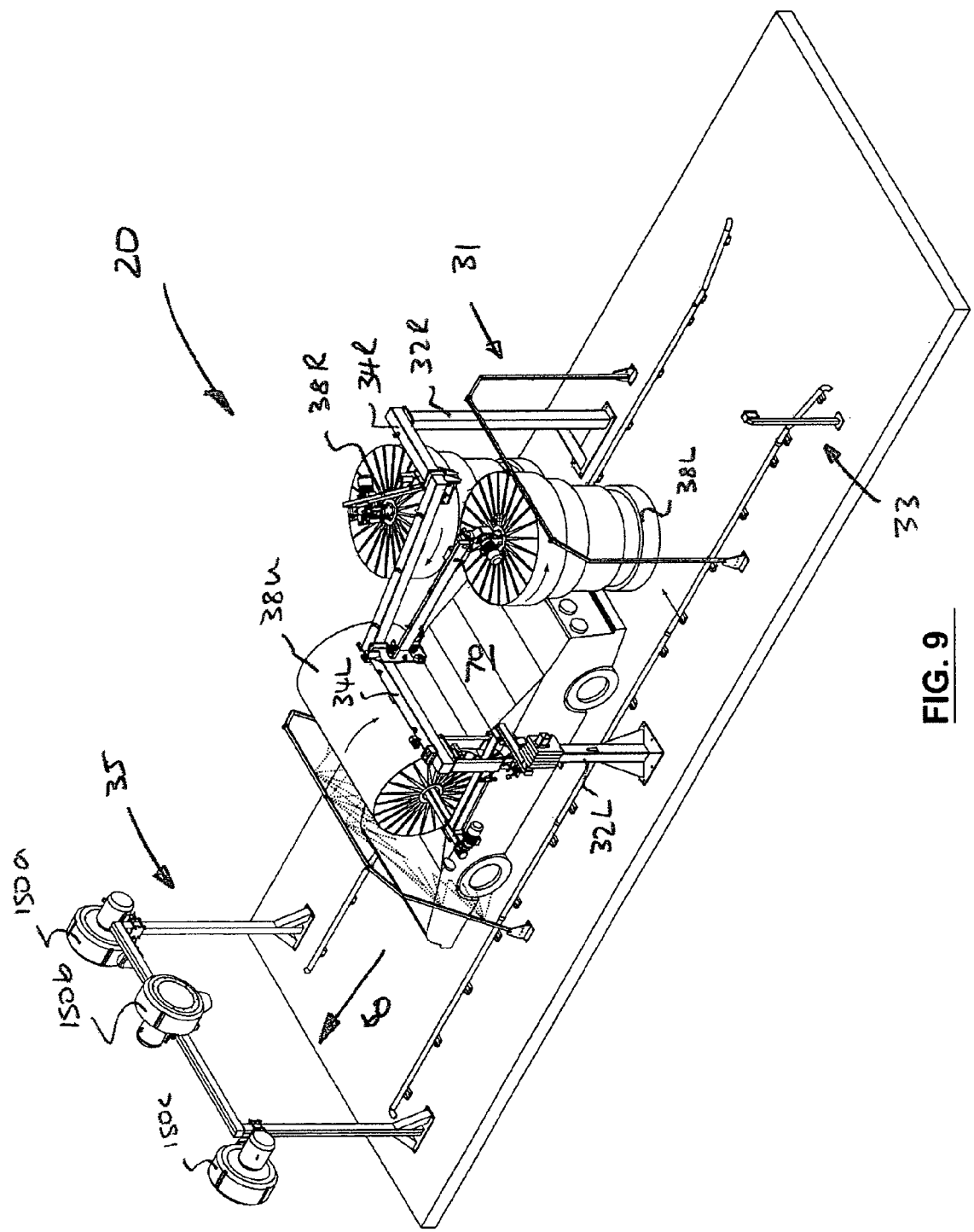
FIG. 9 illustrates, in a perspective view, the complete vehicle wash system of FIG. 1 with the left cylindrical brush in contact with the rear end of the vehicle.

As it is sensed that the rotating left cylindrical brush 38L has arrived at the end of the left side of the vehicle 70, the left brush support positioning device 56L is actuated to move the left brush support member 36L. According to the movement of the left brush support member 36L, the rotating left cylindrical brush 38L is moved to the right along the rear end of the vehicle 70 back to the left inboard position. At the left inboard position, illustrated in FIG. 9, the rotating left cylindrical brush 38L may brush the left and middle portions of the rear end of the vehicle 70. The rotating right cylindrical brush 38R continues to brush the right side of the vehicle 70.

As it is sensed that the rotating right cylindrical brush 38R has arrived at the rear end of the right side of the vehicle 70, the right brush support positioning device is actuated to move the right brush support member 36R. According to the movement of the right brush support member 36R, the rotating right cylindrical brush 38R is moved to the left along the rear end of the vehicle 70 back to the right inboard position thereby cleaning the left and middle portions of the rear of the vehicle. At the right inboard position, illustrated in FIG. 10, the rotating right cylindrical brush 38R may brush the rear end of the vehicle 70. The rotating left cylindrical brush 38L, by this time, is no longer in contact with the vehicle 70.

As the vehicle 70 continues along the path 60, the rotating right cylindrical brush 38R may longer be in contact with the vehicle 70. At such a point in time, the left brush motor 39L and the right brush motor 39R may be deactivated so that the rotation of the respective brushes 38L, 38R ceases.

The vehicle will then continue along path 60 with the upper brush 38U continuing to clean the top surface of the vehicle 60. The vehicle then continues through station 25 where the exterior surface has clean rinse water applied to it, and possibly a wax treatment. Thereafter the vehicle passes through the dryer station where the surface of the vehicle is dried.

Figure 10:
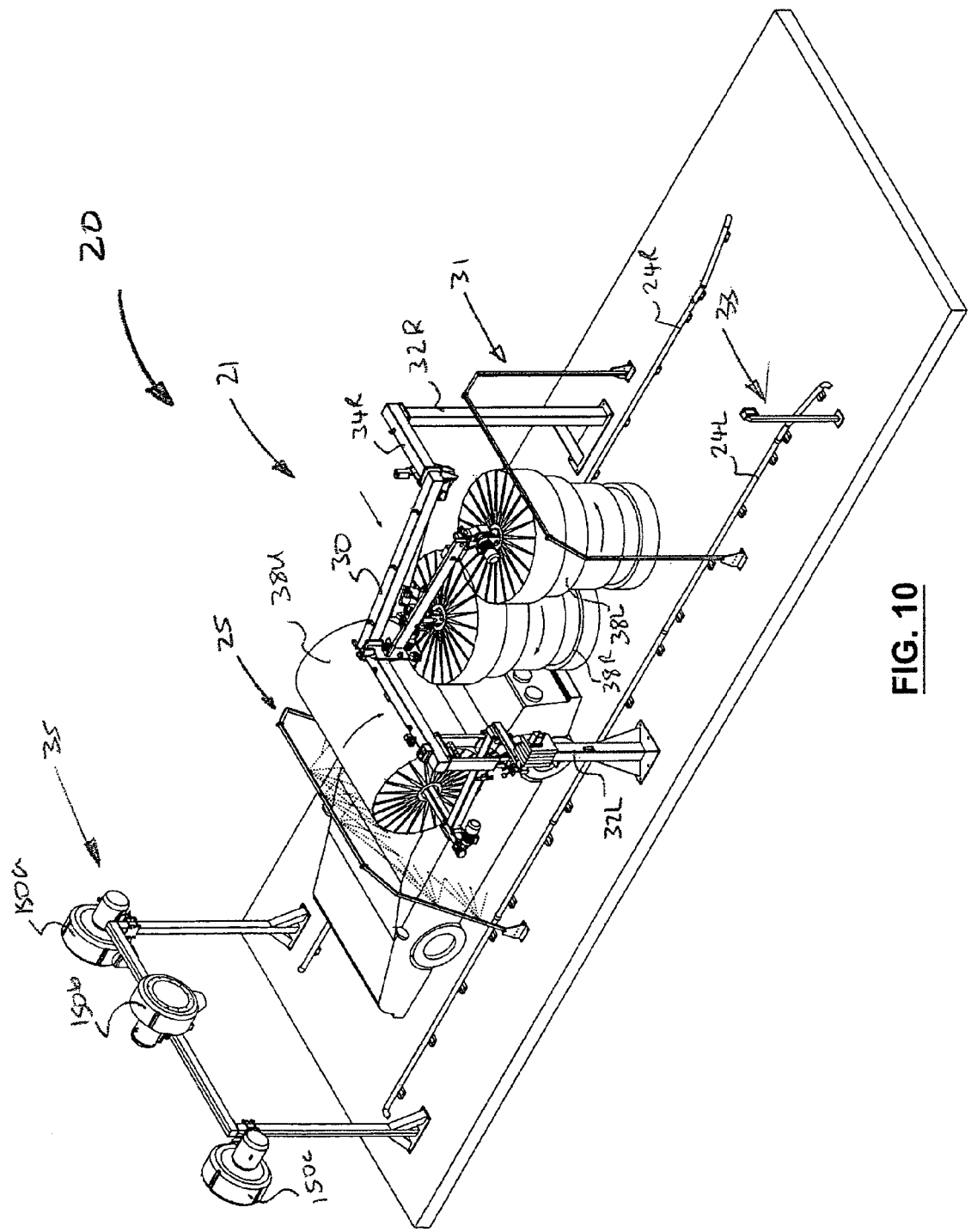
FIG. 10 illustrates, in a perspective view, the complete vehicle wash system of FIG. 1 with the right cylindrical brush in contact with the rear end of the vehicle.

It will be noted that once the vehicle has passed by right and left brushes 38R and 38L, the left brush support positioning device 56L may be actuated to move the left brush support member 36L from the left inboard position, which may be defined by contact between the left brush support member 36L and the second left pivot stop 55BL and is illustrated in FIG. 10, to the left outboard position, which may be defined by contact between the left brush support member 36L and the first left pivot stop 55AL and is illustrated in FIG. 1. Similarly, the right brush support positioning device may be actuated to move the right brush support member 36R from the right inboard position, which is illustrated in FIG. 10, to the right outboard position, which is illustrated in FIG. 1.

In the exemplary embodiment illustrated, the right vertical support member 32R is located closer, by an offset distance, to the point at which the vehicle 70 enters the complete vehicle wash system 20 than the left vertical support member 32L.

Additionally, the offset distance can be a distance approximately equivalent to the sum of the length of the left brush support member 36L and the radius of the left cylindrical brush 38L. As will be clear to a person of ordinary skill in the art, the offset distance may be longer or shorter than that illustrated. Moreover, the offset distance may be in the opposite direction, wherein the left vertical support member 32L is located closer to the point at which the vehicle 70 enters the complete vehicle wash system 20 than the right vertical support member 32R. However, these possible variations from the illustrated embodiment have the drawback that the amount of space required for the brush support 22 is not as optimally compact as the amount of space required for the illustrated embodiment.

Other modifications will be apparent to those skilled in the art and, therefore, the invention is defined in the claims.

I claim:

1. A brush system for use in a vehicle wash system in which during cleaning of a vehicle, said vehicle traverses a path in a direction of travel, said path having a longitudinal axis, said brush system comprising:
    a support frame positioned proximate said path;
    a first brush unit comprising a first brush support mounted to said frame and a first brush mounted on said first brush support;
    a second brush unit comprising a second brush support mounted to said frame and a second brush mounted on said second brush support;
    said first brush support extending generally from said frame in said direction of travel;
    said second brush support extending generally from said frame opposite to said direction of travel;
    said first brush support being mounted to said frame at a first attachment portion at a first longitudinal location on said frame and said second brush support being mounted to said frame at a second attachment portion at a second longitudinal location on said frame, said first longitudinal location being located in a upstream position in said direction of travel relative to said second longitudinal location wherein said first brush support is configured to extend from said first attachment portion at said first location generally longitudinally towards said second location, and wherein said second brush support is configured to extend from said second attachment portion generally longitudinally towards said first location;
    wherein an exterior surface of a vehicle moving through said system in said direction of travel will be cleaned by said first and second brushes cleaning as a result of contact of said first and second brushes against the exterior surface of said vehicle while said vehicle traverses a path in a direction of travel.

2. A brush system as claimed in claim 1 wherein said first brush unit extends longitudinally to at least partially overlap said second brush unit.

3. A brush system as claimed in claim 2 wherein at least one of said first brush support and said first brush extend longitudinally to at least partially longitudinally overlap said second brush.

4. A brush system as claimed in claim 3 wherein said first brush support is mounted to said frame for pivotal movement about a first substantially vertical axis.

5. A brush system as claimed in claim 4 wherein said second brush support is mounted to said frame for pivotal movement about a second substantially vertical axis.

6. A brush system as claimed in claim 3 wherein said first brush support can pivot from a transverse axis about a first pivot location in a range of from 180 to 0 degrees.

7. A brush system as claimed in claim 6 wherein said second brush support can pivot from a transverse axis about a second pivot location in a range of from 0 to 180 degrees.

8. A brush system as claimed in claim 7 wherein said second brush support can pivot from a transverse axis about said second pivot location in a range of from about 90 degrees to about 180 degrees, and said first brush support can pivot from a transverse axis about said first pivot in a range of from about 250 degrees to about 315 degrees.

9. A brush system as claimed in claim 8 wherein the pivotal positions of said first and second support members is varied by a support member moving apparatus.

10. A brush system as claimed in claim 9 wherein said pivotal positions of said first and second support members is controlled by a controller which is in communication with and operable to activate said support member moving apparatus.

11. A brush system as claimed in claim 10 wherein said first pivot location is located between said longitudinal axis of said path and a first outer limit of said path.

12. A brush system as claimed in claim 11 wherein said second pivot location is located proximate said longitudinal axis of said path.

13. A brush system as claimed in claim 11 wherein said second pivot location is located between said longitudinal axis of said path and a second outer limit of said path that is transversely opposite to said first outer limit.

14. A brush system as claimed in claim 1 wherein said first brush support and said first brush are positioned to substantially completely longitudinally overlap said second brush and said second brush support.

15. A brush system as claimed in claim 1 wherein said frame comprises:
a first generally vertically oriented support member;
a first generally transversely oriented support member inter-connected to said first vertically oriented support member, and extending generally transversely across at least part of said path.

16. A brush system as claimed in claim 15 wherein said frame comprises:
second generally vertically oriented support member;
a second generally transversely oriented support member inter-connected to said second vertically oriented support member, and extending generally transversely across at least part of said path.

17. A brush system as claimed in claim 16 wherein said first and second generally transversely oriented support members are interconnected to each other by a generally longitudinally extending frame support member.

18. A brush system as claimed in claim 17 wherein said longitudinally extending frame support member also extends across at least a part of said path.

19. A brush system as claimed in claim 1 wherein said first brush support is mounted to said frame for movement relative to said support frame to enable said first brush to move to clean an exterior surface portion of said exterior surface of said vehicle.

20. A brush system as claimed in claim 19 wherein said second brush support is mounted for movement relative to said support frame to enable said second brush to move to clean an exterior surface portion of said exterior surface of said vehicle.

21. A brush system as claimed in claim 20 wherein said first brush support is mounted to said support frame about a first substantially vertical axis and said second brush support is mounted to said frame for pivotal movement about a second substantially vertical axis.

22. A brush system as claimed in claim 21 wherein during at least part of the movement of said first and second brush supports, said first brush unit at least partially overlaps said second brush unit.

23. A brush system as claimed in claim 21 wherein during at least part of the movement of said first and second brush supports, said first brush unit substantially completely overlaps said second brush unit.

24. A brush system as claimed in claim 21 wherein said second brush support can pivot from a transverse axis about a second pivot location in a range of from about 90 degrees to about 180 degrees, and said first brush support can pivot from a transverse axis about a first pivot location in a range of from about 250 degrees to about 315 degrees.

25. A brush system as claimed in claim 1 wherein said first brush support is mounted to said frame on an opposite side of said longitudinal axis of said path, to the side of the longitudinal axis where said second brush support is mounted to said frame.

26. A brush system as claimed in claim 1 wherein the longitudinal position of said frame in space is fixed and said first brush support is mounted to said frame at a fixed longitudinal position in space and said second brush support is mounted to said frame at a fixed longitudinal position in space.

27. A brush system as claimed in claim 1 wherein each of said first brush and said second brush are rotatable respectively about a first brush axis and a second brush axis and wherein said brush system further comprises a brush drive for driving each of said first brush and said second brush in rotation about respective first brush axis and said second brush axis.

28. A brush system as claimed in claim 27 further comprising a brush support positioning apparatus for positioning each of said first and second brush supports and said first and second brushes to contact said exterior surface of said vehicle.

29. A brush system as claimed in claim 28 wherein said first and second brush axes are oriented generally vertically.

30. A brush system as claimed in claim 29 further comprising a control system operable to activate said brush support positioning apparatus.

31. A brush system as claimed in claim 30 further comprising a sensor system for detecting the movement of the vehicle along the path, said at least one sensor being in communication with said control system and being operable to send a signal to the control system so that said control systems activates said brush support positioning apparatus.

32. A brush system as claimed in claim 28 wherein said first and second brush axes are oriented generally vertically, and said brush system further comprising: a third brush unit comprising a third brush support mounted to said frame and a third brush mounted on said first brush support; wherein said third brush and is rotatable respectively about a third brush axis that is oriented generally horizontally and transversely and wherein said brush system further comprises a brush drive for driving said third brush in rotation about said third brush axis.

33. A brush system for use in a vehicle wash system in which during cleaning of a vehicle, said vehicle traverses a path in a direction of travel, said brush support comprising:
a first generally vertical support member;
a first horizontal support member extending generally horizontally from said first vertical support member, said first horizontal support member extending above said path and generally transverse to said direction of travel;

a first brush support member pivotally attached to, and extending generally horizontally from, said first horizontal support member;

a first cylindrical brush operable to be driven in rotation about a first generally vertical axis;

a first position control apparatus operable to position said first brush support member in a position of initial contact between said vehicle and said first cylindrical brush, said first brush support member extending, in said position of initial contact, away from said first horizontal support member along, and opposite to, said direction of travel;

a second generally vertical support member;

a second horizontal support member extending generally horizontally from said second vertical support member, said second horizontal support member extending ovcrabove said path and generally transverse to said direction of travel;

a second brush support member pivotally attached to, and extending generally horizontally from, said second horizontal support member;

a second brush operable to be driven in rotation about a second generally vertical axis;

a second position control apparatus operable to position said second brush support member in a position of initial contact between said vehicle and said second brush, said second brush support member extending, in said position of initial contact between said vehicle and said second brush, away from said second horizontal support member along and in said direction of travel; said first brush support member being mounted to said first horizontal support member at a first location and said second brush support member being mounted to said second horizontal support member at a second location, said first location being located in a upstream position in said direction of travel relative to said second location wherein said first brush support member is configured to extend from said first horizontal support member generally longitudinally towards said second location, and wherein said second brush support is configured to extend from said second horizontal support member generally longitudinally towards said first location.

34. The brush system of claim 33 wherein said second vertical support member is located on an opposite side of said path from said first vertical support member.

35. The brush system of claim 34 wherein said second vertical support member is located offset along said path from said first vertical support member by an offset distance.

36. The brush system of claim 35 wherein, according to said offset, said vehicle traversing said path passes said second vertical support member before passing said first vertical support member.

37. The brush system of claim 35 wherein said offset distance is about equivalent to a length of said first brush support member added to a radius of said first brush.

38. The brush system of claim 33 further comprising a longitudinal member connecting said first horizontal support member to said second horizontal support member.

39. The brush system of claim 33 wherein said first position control apparatus comprises a pneumatic cylinder.

40. A brush system as claimed in claim 33 wherein said first brush support member is mounted to said frame on an opposite side of a longitudinal axis of said path, to the side of the longitudinal axis where said second brush support member is mounted to said frame.

41. A brush system as claimed in claim 33 wherein the longitudinal position of said frame in space is fixed and said first brush support is mounted to said frame at a fixed longitudinal position in space and said second brush support is mounted to said frame at a fixed longitudinal position in space.

42. A brush system as claimed in claim 33 further comprising a brush drive for driving each of said first brush and said second brush in rotation about respective said first axis and said second axis.

43. A brush system as claimed in claim 42 wherein said first and second brush axes are oriented generally vertically.

44. A brush system as claimed in claim 43 further comprising a control system operable to activate said first position control apparatus and a second position control apparatus.

45. A brush system as claimed in claim 44 further comprising a sensor system for detecting the movement of the vehicle along the path, said at least one sensor being in communication with said control system and being operable to provide a signal to said control system so as to control the movement of said first brush control apparatus and said second brush control apparatus.

46. A brush system as claimed in claim 43 further comprising: a third brush unit comprising a third brush support mounted to said frame and a third brush mounted on said first brush support; wherein said third brush and is rotatable respectively about a third brush axis that is oriented generally horizontally and transversely and wherein said brush system further comprises a brush drive for driving said third brush in rotation about said third brush axis.

47. A brush system as claimed in claim 33 wherein said first and second horizontal support member are interconnected by a generally longitudinally oriented frame support member.

48. A brush station for use in a vehicle wash system in which during cleaning of a vehicle, said vehicle traverses a generally longitudinal path in a direction of travel, said path having a longitudinal axis, said brush station comprising:

a support frame positioned proximate said path and fixedly located so as to not translate longitudinally in space;

a first brush support mounted to said frame for movement within said path;

a first brush mounted on said first brush support member;

a second brush support mounted to said frame for movement across within said path;

a second brush mounted on said second brush support;

said first brush support extending generally from said frame in said direction of travel;

said second brush support extending generally from said frame generally in a direction that is opposite to said direction of travel;

said first brush support being mounted to said frame at a first location and said second brush support being mounted to said frame at a second location, said first location being located in a upstream position in said direction of travel relative to said second location;

said first and second brush supports being mounted to said frame so that said first and second brush supports and said first and second brushes do not translate longitudinally in space;

wherein an exterior surface of a vehicle moving through said station in said direction of travel will be cleaned by said first and second brushes as a result of contact of said first and second brushes against said exterior surface of said vehicle while said vehicle traverses said path in said direction of travel.

49. A brush station as claimed in claim 48 wherein at least one of said first brush support and said first brush extend longitudinally to at least partially longitudinally overlap said second brush.

50. A brush station as claimed in claim 48 wherein said first brush support and said first brush are positioned to substantially completely longitudinally overlap said second brush and said second brush support.

51. A brush station as claimed in claim 48 wherein said first brush support is mounted to said frame on an opposite side of said longitudinal axis of said path, to the side of the longitudinal axis where said second brush support is mounted to said frame.

52. A brush station as claimed in claim 48 wherein the longitudinal position of said frame in space is fixed and said first brush support is mounted to said frame at a fixed longitudinal position in space and said second brush.

53. A brush station as claimed in claim 48 wherein each of said first brush and said second brush are rotatable respectively about a first brush axis and a second brush axis and wherein said brush system further comprises a brush drive for driving each of said first brush and said second brush in rotation about respective first brush axis and said second brush axis.

54. A brush station as claimed in claim 53 wherein said first and second brush axes are oriented generally vertically.

55. A brush station as claimed in claim 54 further comprising a brush support positioning apparatus for positioning each of said first and second brush supports and said first and second brushes to contact said exterior surface of said vehicle.

56. A brush station as claimed in claim 55 further comprising a control system operable to activate said brush support positioning apparatus.

57. A brush station as claimed in claim 56 further comprising a sensor system for detecting the movement of the vehicle along the path, said at least one sensor being in communication with said controller and being operable to provide a signal to said control system so that said control system activates said brush support positioning apparatus.

58. A brush system for use in a vehicle wash system in which during cleaning of a vehicle, said vehicle traverses a path in a longitudinal direction of travel, said brush system comprising:
a support frame positioned proximate said path and being generally fixed longitudinally in space;
a first brush unit comprising a first brush support mounted to said frame and a first brush mounted on said first brush support;
a second brush unit comprising a second brush support mounted to said frame and a second brush mounted on said second brush support;
said first brush support extending generally from said frame in said direction of travel;
said second brush support extending generally from said frame opposite to said direction of travel;
said first brush support being directly connected to said frame at a first longitudinal location that is fixed in space and said second brush support being directly connected to said frame at a second longitudinal location that is fixed in space, said first longitudinal location being located in a upstream position in said direction of travel relative to said second longitudinal location wherein said first brush support is configured to extend from an attachment position at said first longitudinal location generally longitudinally towards said second location, and wherein said second brush support is configured to extend from an attachment position at said second location generally longitudinally towards said first location;
wherein an exterior surface of a vehicle moving through said system in said direction of travel will be cleaned by said first and second brushes.

\* \* \* \* \*

UNITED STATES PATENT AND TRADEMARK OFFICE
CERTIFICATE OF CORRECTION

| | | |
|---|---|---|
| PATENT NO. | : 8,099,816 B2 | Page 1 of 1 |
| APPLICATION NO. | : 11/195960 | |
| DATED | : January 24, 2012 | |
| INVENTOR(S) | : Daniel J. MacNeil | |

It is certified that error appears in the above-identified patent and that said Letters Patent is hereby corrected as shown below:

In the Claims

Column 13
Claim 33, line 16, replace "ovcrabove" with -- above --

Signed and Sealed this
Seventh Day of May, 2013

Teresa Stanek Rea
*Acting Director of the United States Patent and Trademark Office*